A. K. RIDER,

Assignor, by mesne assignments, to C. H. DELAMATER & T. J. RIDER.

Pump Valve.

No. 9,388. Reissued Sept 28, 1880.

WITNESSES:

E. Nottingham,

A. L. Lawrence.

INVENTOR:

A. K. Rider,

By H. A. Seymour,

ATTORNEY.

N. PETERS, PHOTO-LITHOGRAPHER, WASHINGTON, D. C.

UNITED STATES PATENT OFFICE.

ALEXANDER K. RIDER, OF WALDEN, ASSIGNOR, BY MESNE ASSIGNMENTS, TO CORNELIUS H. DELAMATER AND THOMAS J. RIDER, OF NEW YORK CITY, N. Y.

PUMP-VALVE.

SPECIFICATION forming part of Reissued Letters Patent No. 9,388, dated September 28, 1880.

Original No. 89,344, dated April 27, 1869. Application for reissue filed July 19, 1880.

*To all whom it may concern:*

Be it known that I, ALEXANDER K. RIDER, of Walden, in the county of Orange and State of New York, have invented certain new and useful Improvements in Pump-Valves; and I do hereby declare the following to be a full, clear, and exact description of the invention, such as will enable others skilled in the art to which it pertains to make and use it, reference being had to the accompanying drawings, which form part of this specification.

My invention relates to an improvement in pump-valves, the object being to secure long induction and eduction ports of any desired capacity, and self-acting valves of such construction that they will close tightly upon the valve-seats without being subjected to any undue friction or wear, and will readily move away from the valve-seat and form a capacious passage for the entrance or exit of the fluid or gas to or from the pump-cylinder.

With these ends in view my invention consists, essentially, in a cylindrical pump-valve located within a valve-chamber provided with a raised valve-seat and devices for guiding the valve as it is raised and to retain the valve when closed on its raised valve-seat.

My invention further consists in a cylindrical pump-valve, in connection with means for guiding the valve and retaining it in a line passing through the port at right angles to the valve-seat.

My invention further consists in a cylindrical pump-valve, in connection with a valve-casing provided with webs and bonnets for securing the webbed portion of the valve-casing in place.

Figure 1:
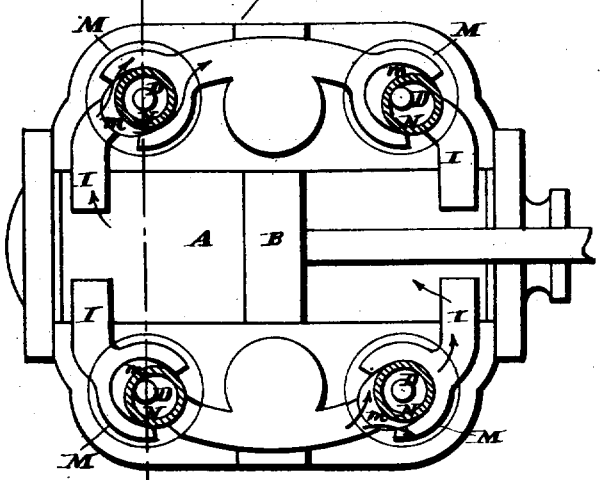
Figure 2:
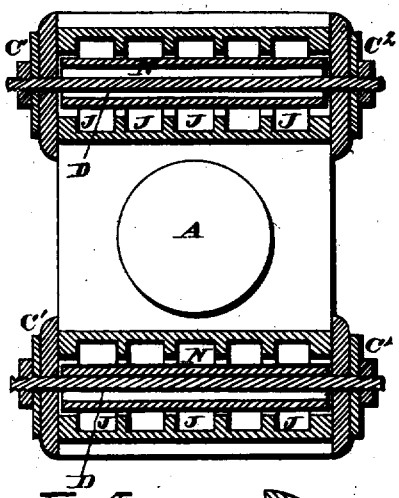
Figure 3:
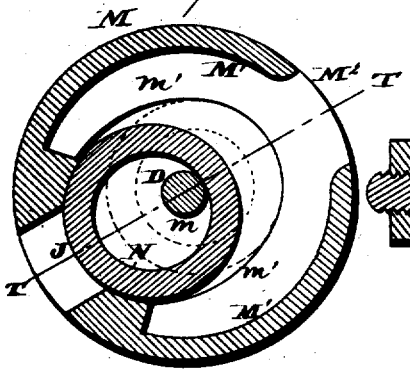
Figure 4:
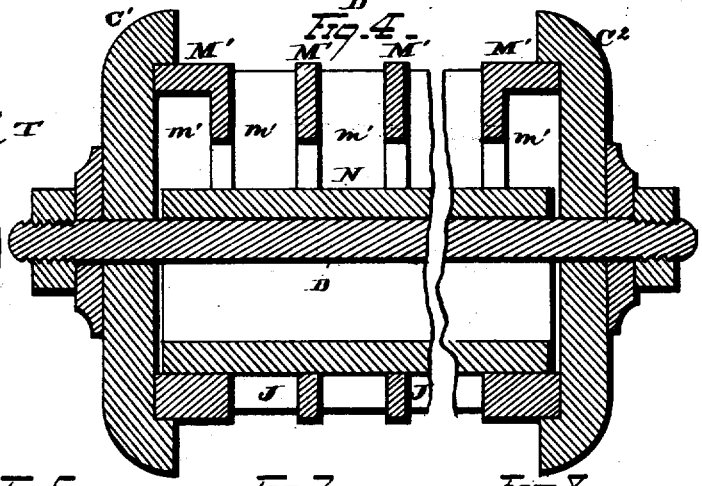
Figure 5:
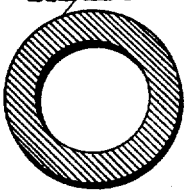
Figure 6:
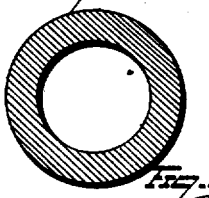
Figure 7:
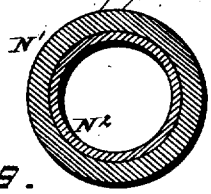
Figure 8:
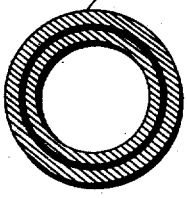
Figure 9:
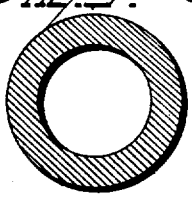

In the accompanying drawings, Figure 1 is a longitudinal section of a pump provided with my improved pump-valves. Fig. 2 is a cross-section on line S S of Fig. 1. Fig. 3 represents a transverse section of the valve and its seat and cage on an enlarged scale. Fig. 4 is a longitudinal section taken in line T T of Fig. 3. Fig. 5 is a cross-section of a cylindrical valve made all of rubber. Fig. 6 is a cross-section of the valve made of brass. Fig. 7 is a cross-section of the valve made of rubber and brass. Fig. 8 is a cross-section of the valve made of rubber and linen; and Fig. 9 is a cross-section of the valve made of iron.

A is the cylindrical chamber which forms the body of the pump proper, and B is a piston of any approved construction, reciprocated therein by any approved means. It may be operated by steam or other power, may stand in the perpendicular, horizontal, or variously-inclined position, may be made of cast-iron, brass, or other suitable material, may be lined, enameled, or otherwise prepared, and the piston may be constructed and packed in any approved manner. In short, the pump in all the points other than those to which my invention directly relates may be of any approved kind.

I represents the ports or passages which admit the water into the barrel A of the pump and permit its discharge therefrom. Through the ports I, and at opposite ends of the pump-cylinder, are formed cylindrical chambers or holes extending through the casting forming the body of the pump. Within these holes or chambers are removably secured the bushings or valve-cages M, by means of the bonnets $b'$ $b^2$, which latter cover the ends of the valve chamber or bushing, and are retained in place by bolts D.

N designates the cylindrical valves, each being located within an opening, *m*, in the bushing or valve-chamber M. The four valves and their respective bushings may be exactly alike. A minute description of one will serve for the whole, the only difference necessary being the change of position or inclination.

The valve N may be formed entirely of vulcanized rubber, or it may serve a tolerable purpose if formed of brass, iron, or various other material, but necessarily in the form of a cylinder. In Fig. 7 the valve is represented as being formed of a tube of india-rubber, N′, drawn tightly over a tube of brass or other suitable material, $N^2$. The bushing M is hollowed out by coring or by suitable tools, or partly by each of these processes, so as to form a valve-seat, J, which may be grated or cross-barred, as indicated, to afford a better bearing for the valve when it closes upon its seat.

The valve-seat J is of concave form, to correspond with the cylindrical surface of the valve and allow the latter to fit snugly therein. Again, the valve-seat J is raised above the bottom or shell of the valve-chamber, and thereby prevents the lodgment of sand or other obstructions on the valve-seat, thus enabling the valve to come snugly against its seat at every stroke of the pump.

The width of the opening in the valve-seat J corresponds to the width of the port I, and the metal or shell of the bushing M is solid or imperforate on each side of the valve-seat. When the cylindrical valve N is pressed against the valve-seat it serves to cover tightly the entire length of the opening through the valve-seat and the port or passage I, and prevents any access of water to the valve-chamber. When the force of the water lifts the valve it is allowed, by the form and size of the chamber *m*, within the bushing M, to rise from its seat; but the rise is limited, the limit of movement being sufficient to allow the water to flow freely around the valve on opposite sides thereof and through the passages *m'*, through the exit-opening $M^2$ on the side of the bushing M opposite the valve-seat. Passages *m'* are very capacious, and are divided by slight webs M', which latter may be connected together around the whole exterior of the bushing, excepting at the ports I I. The remaining surface of the bushing may be either grated or ribbed, or it may be a continuous shell.

It will now be seen that in the working of the pump my several induction and eduction valves move away from their seats and again return to them by the action of the water, the same as ordinary pump-valves, but their action is rendered uniform and certain, owing to the increased area of valve-surface exposed to the pressure of the water in opening and closing the valves.

It will further be observed that the valves are allowed a free rolling action or movement within their chambers, and hence are not subjected to constant wear on any particular portion of their periphery, but are caused to wear evenly and uniformly, and thus my improved valves are of great durability and will last a great length of time without the necessity of replacement by new valves. The yielding material of which the valve is composed enables it to adapt itself to any inequalities or imperfections in the valve-seat, and thus prevent the escape of water or gas past the valve.

By the employment of my improved cylindrical valve ports of any desired length may be employed, and thus insure a free entrance and exit of fluid or gas to and from the pump-cylinder.

The valve is caged by the bushing very effectually, and in case any disarrangement or clogging should possibly occur, or any repairs, even, become necessary, one or both the bonnets may be removed by simply taking off a nut from the bolt D, and the valve may be immediately drawn out and examined. The bushings M may also be removed for examination or repairs, if desired.

My invention, as above described, may be applied on pumps for pumping hot or cold water, air, gases, or any fluid which will not affect the materials. In case oils, acids, or the like are pumped which will affect rubber, I make the valve entirely of metal, or of metal covered with leather, felt, or other suitable soft material which will remain unaffected.

In constructing my pump for pumping air I esteem it important to place the valve and its bushing as near the main chamber A as is practicable.

The construction of my valve in two concentric tubes—the exterior of rubber and the interior of brass, or the like—renders it practicable to secure the requisite stiffness and strength in the valve, with great capacity for adapting itself to irregularities in the seat, while all the moving parts may be extremely light and ready to move with the least amount of resistance from inertia or other cause.

I can dispense with separate bushings by casting the valve-chambers in one piece with the pump, giving such chambers the same internal form as the bushings described.

Having fully described my invention, what I claim as new, and desire to secure by Letters Patent, is—

1. A cylindrical pump-valve, in combination with a valve-chamber provided with a raised valve-seat, and devices for guiding the valve as it is raised, and to retain the valve, when closed, on its raised valve-seat, substantially as set forth.

2. A cylindrical pump-valve, in combination with a valve-chamber provided with means for guiding the valve and retaining it in a line passing through the port at right angles to the valve-seat, substantially as set forth.

3. A cylindrical pump-valve, in combination with a valve-casing provided with webs and bonnets for securing the webbed portion of the valve-casing in place, substantially as set forth.

In testimony whereof I have hereunto set my hand in the presence of two subscribing witnesses.

ALEXANDER K. RIDER.

Witnesses:
GEO. W. STODDARD,
C. W. SADLIER.